United States Patent [19]

Elser et al.

[11] Patent Number: 5,099,939
[45] Date of Patent: Mar. 31, 1992

[54] MULTI-AXLE STEERING SYSTEM

[75] Inventors: Dieter Elser, Essingen; Walter Kogel, Abtsgmünd, both of Fed. Rep. of Germany

[73] Assignee: Zahnradfabrik Friedrichshafen, AG., Friedrichshafen, Fed. Rep. of Germany

[21] Appl. No.: 499,542

[22] PCT Filed: Feb. 1, 1989

[86] PCT No.: PCT/EP89/00079
§ 371 Date: Jul. 6, 1990
§ 102(e) Date: Jul. 6, 1990

[87] PCT Pub. No.: WO89/07065
PCT Pub. Date: Aug. 10, 1989

[30] Foreign Application Priority Data

Feb. 4, 1988 [DE] Fed. Rep. of Germany ....... 3803205

[51] Int. Cl.⁵ ............................................. B62D 9/00
[52] U.S. Cl. ...................................... 180/140; 280/91
[58] Field of Search ............... 180/132, 140, 141, 143, 180/158; 280/91

[56] References Cited

U.S. PATENT DOCUMENTS 4,702,333 10/1987 Lippert ................................. 180/140
4,884,647 12/1989 Mimuro et al. .................... 180/141

FOREIGN PATENT DOCUMENTS

0079088 5/1983 European Pat. Off. .
0225773 6/1987 European Pat. Off. .
0009076 1/1989 Japan ................................. 180/140
2127362 4/1984 United Kingdom .

Primary Examiner—Mitchell J. Hill
Attorney, Agent, or Firm—Albert M. Zalkind

[57] ABSTRACT

In multifront and rear steering systems a problem exists due to fluid leakage which causes lack of synchronization in return to straight ahead steering position between the front and rear steering linkages causing inaccurate centering of the rear steering linkage in response to manual control of centering of the front steering linkage, where the front steering power is hydraulic and the rear steering power is hydrostatic. The invention provides the particular novelty of a centering device for the rear wheel steering linkage responsive to directional manipulation of the front wheels at the will of a driver from a steered position to a straight ahead position. In one embodiment a power steering cylinder is coupled to the rear steering linkage for effecting steering movement or return. Also connected to the rear steering linkage is a cylinder having a locking device and the centering device connected to actuate the rear steering linkage pursuant to automatically operating circuitry, within the skill of the art. A second embodiment combines the rear power steering cylinder with the locking device and centering device in a single housing.

6 Claims, 5 Drawing Sheets

MULTI-AXLE STEERING SYSTEM

This invention relates to a multi-axle steering system with a mechanical hydraulic steering gear having a booster pressure steering cylinder to augment the manual steering force for front steering and a hydrostatic steering cylinder for rear steering and having a locking device to lock the rear steering wherein the locking device is arranged in the rear steering rod linkage. The locking device has a piston rod with a lockable piston and couples to the rear steering linkage which is locked mechanically by a locking piston on a piston rod which is part of a centering device wherein locking holds the rear axle in straight ahead position.

BACKGROUND OF THE INVENTION

Such a steering mechanism is described, for example, in DE-OS (German Patent application laid open to inspection) 36 15 720 (U.S. Pat. No. 4,884,647 to Mimuro) which has mechanical locking when the rear steering linkage is in straight ahead steering position.

The disadvantage is that as a result of valve leakages or other sealing defects leakage of a hydrostatic system causes displacement of the hydrostatic steering power cylinder as a result of which the positions of the front and rear steering linkages are not synchronized. Thus, it is necessary by means of a manual procedure, to turn off a selector switch for the purpose of engaging the second (rear) axle or several axles. During the next following overtravelling of the now additionally connected axle, the latter was then centered and blocked in the straight ahead position. After that, it was possible to control the axle again for steering purposes.

The prior art illustrates a manually operated valve with a centering device, whereby the centering function is performed only by a biasing spring acting to lock a piston rod in centered position. The disadvantage is that only a certain spring characteristic is available and that there is always a counterpressure. Besides, the characteristic of the device is limited.

SUMMARY OF THE INVENTION

The purpose of the present invention is to create a multi-axle steering system wherein synchronization of the steered axles with respect to each other will be possible during continuous operation.

By means of the centering device disclosed, especially by means of pressure forces on centering pistons, renewed synchronization or a synchronizing impulse is always provided continually during operations. During an overtravel of the straight ahead position of the front axle which is returned by the vehicle driver, force is applied to the steering linkage as a reversing impulse to the centering pistons.

This return of the front steering to straight ahead by the vehicle driver, controls the rear steering linkage to change direction back and forth until a centered position is reached to coincide with the straight ahead position of the front steering linkage. Thus, leakage which causes displacement of the power steering cylinder of the hydrostatic system is synchronized for straight ahead position for front and rear steering linkages.

The centering device of the invention facilitates a return of the rear steering linkage into the straight ahead position in every situation.

Yet another advantage is represented by the connection with the locking device which generally is so designed that it can be overridden in an emergency so that, especially in the case of all terrain vehicles, there cannot be any breakages in mechanical parts and the centering device acts as counterpressure in this forced steering deflection. A buffer, e.g., shock absorber, is thus created.

For example, once an overload has disappeared, there will be an automatic return to the straight-ahead position by providing pressure to the centering piston chambers.

In this way, the pressure required for centering and return is always present. This means that, even in case of failure of the hydraulic steering system, return and centering can take place via the pressure force. For safety reasons, the system can be so connected that, for example, in case of a pressure drop and upon the attainment of a certain minimum pressure in the pressure accumulator the steering linkage will be returned to a straight-ahead position.

Pumps are usable as a pressure medium source but preferably accumulators are used for.

It is advantageous if the two centering pistons, when in a steering position, are pressured by an additional accumulator. The pressure in that pressure accumulator is selected relatively low, which is normally used steering, here compared to a high pressure accumulator normally used for centering. However, to achieve a rather minor force in the centered position low pressure is used when the centering pistons are centered and come to rest at that time against internal stops in the housing. In this way, there is no need for any long travelling distances if, via the pressure medium source, high pressure, for the purpose of returning the steering linkage, is used to effect the neutral position.

Another, very advantageous feature of the invention consists in the fact that a choke is inserted in a pressure relief line of the centering device in combination with a component of a rear linkage locking device in one embodiment.

In practice, a pressure head is generated in both piston chambers by the choke. This pressure head leads to an attenuated return. In the deflected state, the pressure from the piston chamber, which is reduced, can escape only in a throttled manner. This effects a pressure in the locking device to prevent a mechanical interference of moving parts such as a locking piston and coacting lockable piston. The piston rod in another embodiment, carries centering pistons and a lockable piston on an end. In said one embodiment, the lockable piston is between the centering pistons and also serves as a travel centering stop. In that embodiment the locking pistoon has the novel feature of having a pressure relief bore therethrough in which a choke is located.

Thus, a pressure head will be formed under a locking piston to make sure that the locking piston will not be forced into its locking position before a coacting lockable piston linkage has returned to neutral.

The locking piston is pressurized out of locking position when steering is desired. This represents a reversal of the means provided for locking when compared to the above mentioned prior art and also because unlocking pressure is always available the arrangement is both simpler and safer.

Several leaf springs, in stacked array, can be provided as a spring bias to move the locking piston against the coacting locking piston on the piston rod.

The centering housing and booster steering cylinder can be built into an elongated housing in the embodiment just described. If the pressure in the booster steering cylinder is selected under certain circumstances higher than that pressure for the centering device, the booster steering cylinder can then be used for steering. In case of any external interference, it may be necessary to make sure that the rear axle will be centered in the straight ahead position. If the pressure in the booster steering cylinder thus decreases correspondingly, then, by means of the low pressure accumulator, a steering return is achieved for the centering device with simultaneous locking and centering. This emergency function is basically possible also when the two cylinders are separate parts; but in this case, the entire force for return must be transmitted via the centering device and via the entire steering linkage to the booster steering cylinder and corresponding dimensioning of the cooperating parts is necessary.

The area in which the centering takes place, that is to say, the range of angular off center deviation in which the centering piston chambers are pressurized, can be chosen as a function of the steering angle of the front axle. For example, a steering angle of 5 degrees or more in either direction.

BRIEF DESCRIPTION OF THE INVENTION

A detailed description of the invention now follows in conjunction with the appended drawing in which.

DESCRIPTION OF THE PREFERRED EMBODIMENTS

Figure 1:
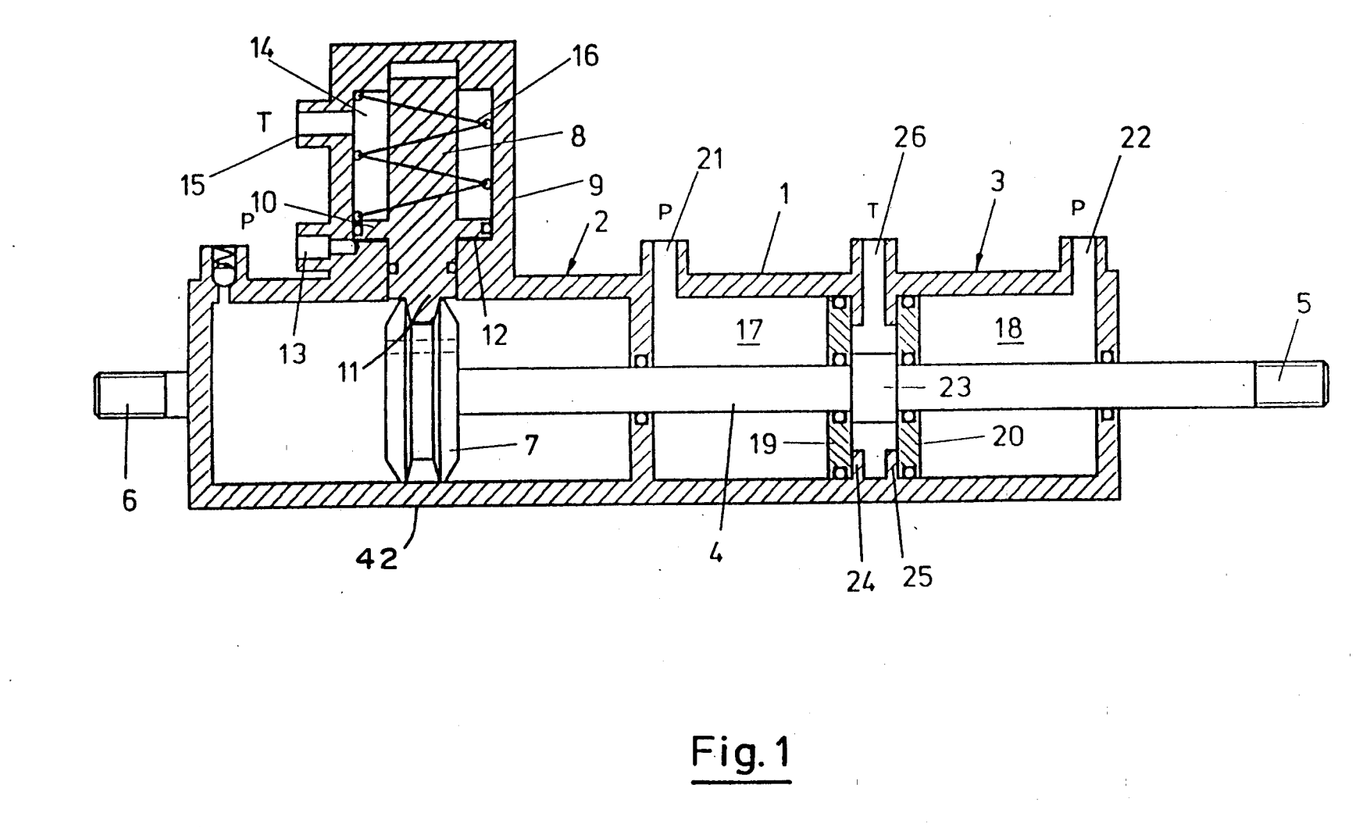
FIG. 1 shows an axial section through a locking or blocking centering device in the straight-ahead steering position.
Figure 2:
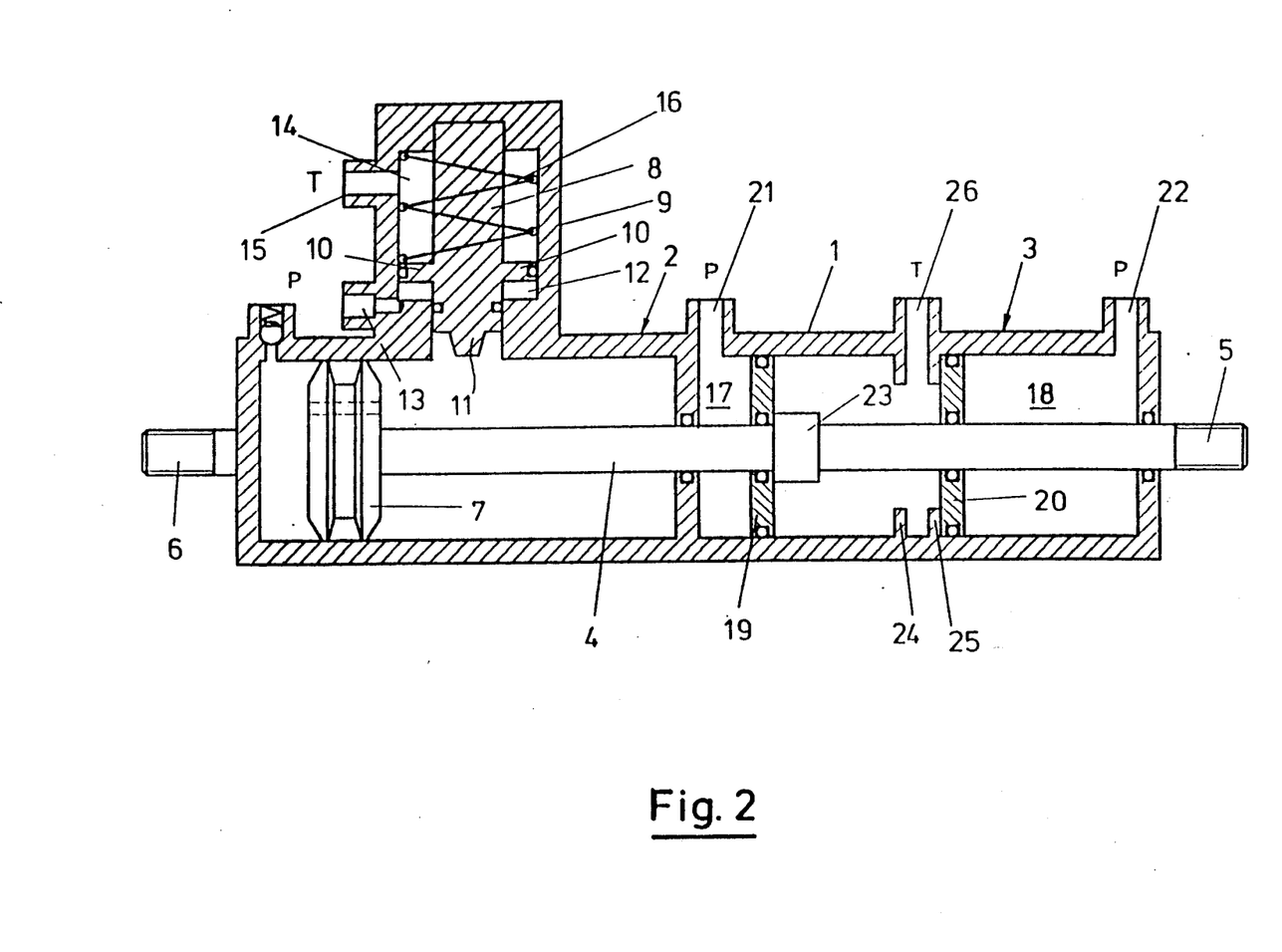
FIG. 2 shows a section as in FIG. 1 but showing an actuated steering position.
Figure 3:
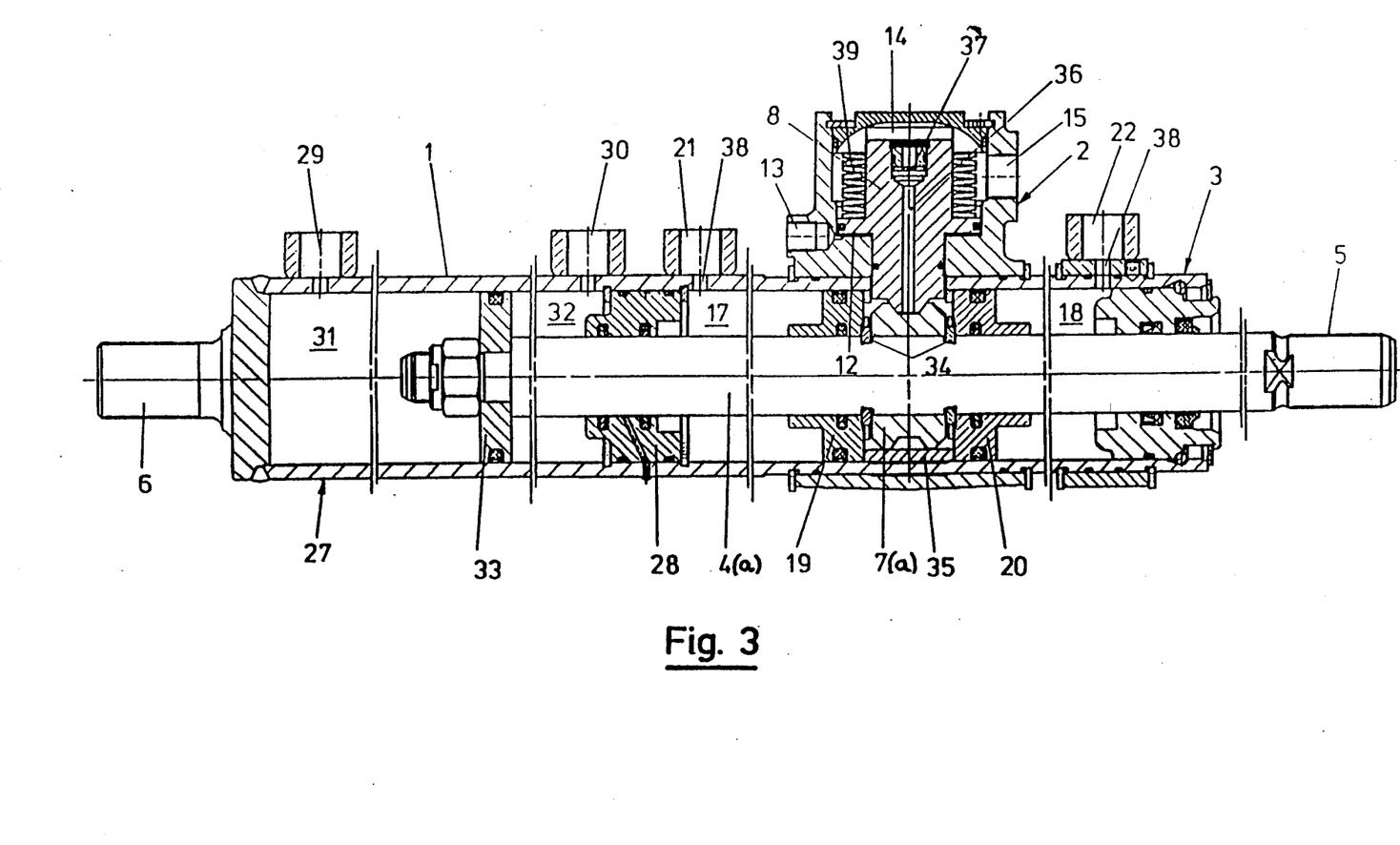
FIG. 3 shows an axial section through a combined locking and centering device and steering power cylinder.
Figure 4:
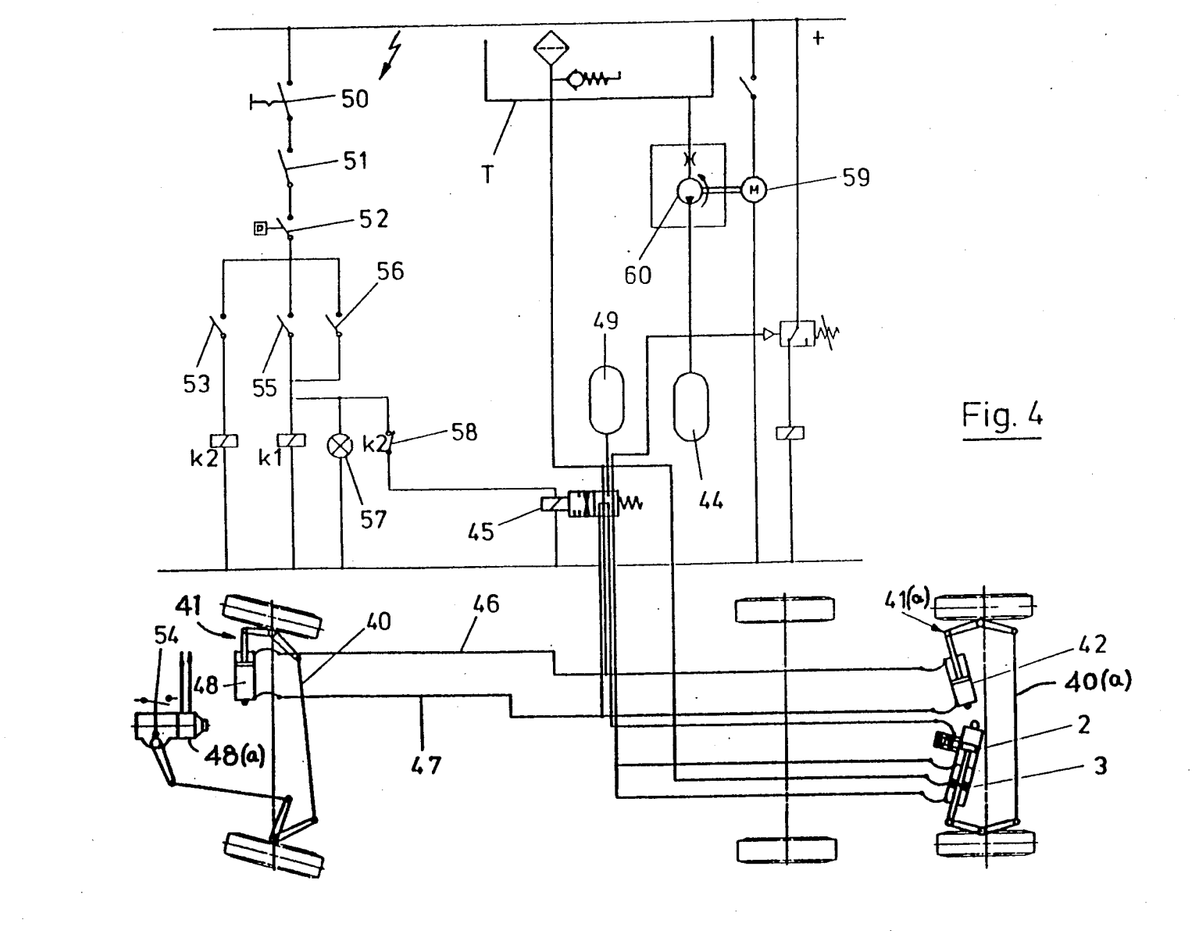
FIG. 4 shows hydraulic circuit diagram and means of control for a multi-axle steering system based on FIGS. 1 and 2.

In brief:

FIGS. 1 and 2 show the centering device 3 with a separate steering power cylinder 48 shown in FIG. 4, the centering device 3 for rear axle 40a being shown in FIG. 4. The centering travel limit collar 23 fixed on piston rod 4 is in FIGS. 1 and 2 and as 7(a) in FIG. 3 where it serves as both a lockable piston and a travel limit collar.

Also shown in FIG. 4 is a conventional arrangement of a steering wheel actuated gearing mechanism 48(a); the two arrows extending from that mechanism are oil lines associated with the steering pressure oil control valve simultaneously controlled by the steering wheel. The locking mechanism is generally indicated by the arrow 2, the locking device 3 is indicated. FIG. 4 also shows, respectively, the respective high and low pressure sources as accumulators 44 and 49, accumulators being used to ensure pressure sources at all times.

The embodiment shown in FIG. 3 shows an integrally combined centering device 3 in an elongated housing with a steering power cylinder having pressure chambers 31, 32 and reciprocally driven piston 33 on piston rod 4(a) which fixedly carries the centering travel limit stop 7(a).

Figure 5:
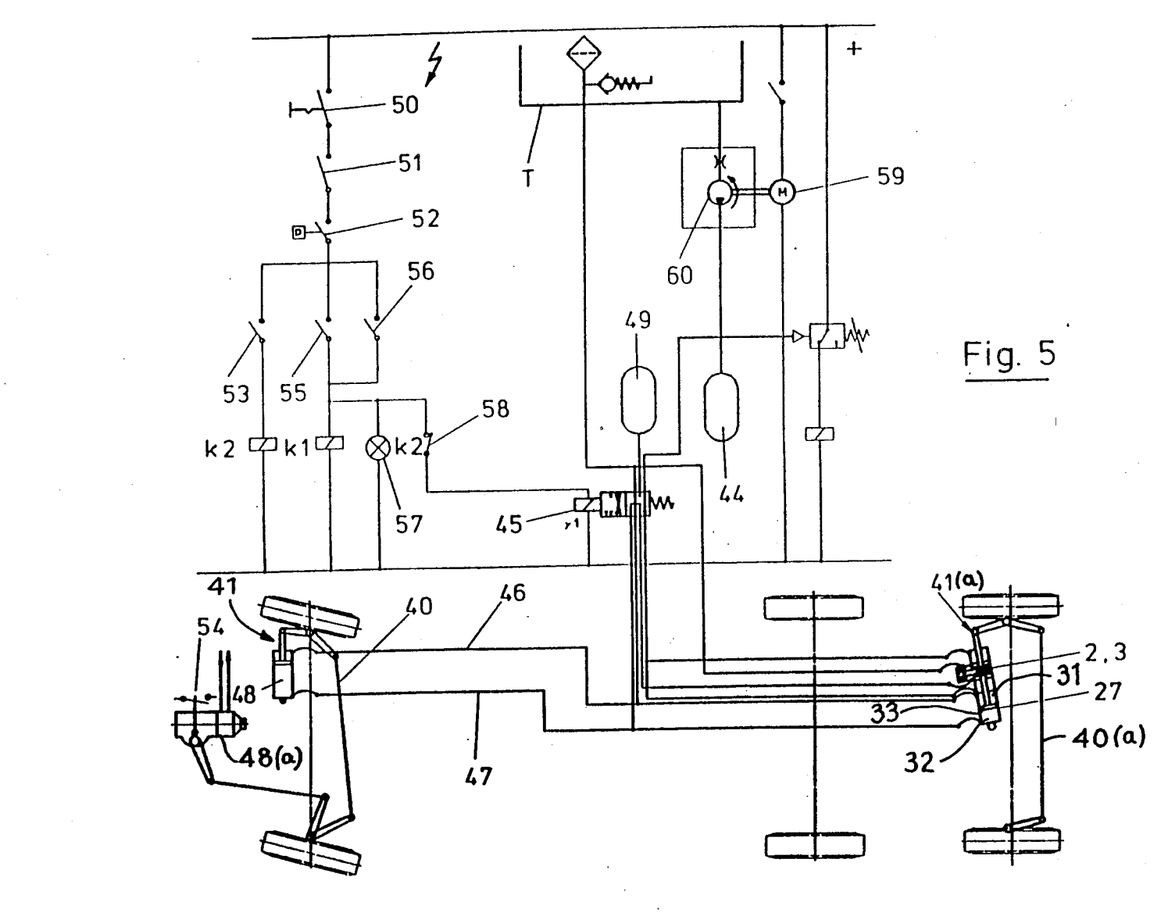
FIG. 5 shows hydraulic circuit and control diagram and means of control of the multi axle steering system for the modification of FIG. 3.

FIGS. 4 and 5 show a contact or sensor 54 at the manual operable gear mechanism 48(a) which sends a signal to switch 53 comprised in the control means control of valve 45.

In general high pressure is used in the centering mechanism to effect centering of the rear steering linkage while low pressure is used for steering power in either embodiment of the invention.

Basically, the front steering linkage is returned to center position or in a close angular range to center after a steering operation by the vehicle driver. Thus, any slight deviation from straight ahead sets the system in operation for centering the rear steering linkage so as to synchronize with the front steering linkage. Ultimately the front steering linkage is centered the rear steering linkage is centered.

The piston rod 4, FIGS. 1 and 2, has a coupling end portion 5 while the closed end of housing 1 has a coupling 6. A grooved lockable piston 7 (or 7(a), FIG. 3) is provided on the piston rod 4 (or 4(a)) respectively.

Lockable piston pressure 7 is engaged as shown in FIG. 1 by a locking piston 8 which has a lug 11 in the groove in locking position. Locking piston body 8 is positioned and guided in housing 9 on cylinder housing 1. A piston chamber 12 with a pressure connection 13 encloses the locking piston 8. Behind locking piston 8 there is a pressure equalization chamber 14 to connect with a tank T via a connection 15. A bias spring 16 biases locking piston 8 in the locking position as shown in FIG. 1.

The more detailed structure and operating procedure of locking mechanism 2 is described in greater detail in the prior art.

A centering device 3 has housing 1 with centering piston chambers 17 and 18 and two respective centering pistons 19 and 20. Centering pistons 19 and 20 are arranged slidably on piston rod 4. Centering piston chambers 17 and 18 have respective pressure inlet ports 21 and 22. Between the two centering pistons 19 and 20 is a collar 23 fixed on the piston rod, as a stop for both centering pistons 19 and 20 when centered.

In conjunction with collar 23, travel of the piston rod is limited by fixed annular rings 24 and 25, fixed in the housing, extending radially therein as shown. Between the two rings 24 and 25, there is an outlet port 26 that is connected with tank T. Seen in FIG. 1, the two centering pistons 19 and 20, with opposing faces rest against respective faces of collar 23 and against travel stop rings 24 and 25, when in the centered position for straight-ahead running.

FIG. 2 illustrates a position of a practical example in a steered position as compared with FIG. 1. If the steering power cylinder is supplied with pressure medium for the actuation of the steering linkage and if pressure is simultaneously fed via pressure connection 13 into piston chamber 12, then locking piston 8 is released from locking the lockable piston 7, against the bias of a spring 16. In this way, piston rod 4 connected with the rear steering linkage can be shifted correspondingly (to the left in FIG. 2). By means of collar 23, centering piston 19 is thus likewise shifted to the left, while centering piston 20, by virtue of its shiftability on piston rod 4, continues to rest against the travel limit ring 25 in its fixed position in the housing. Steering in the conventional manner occurs. But if there is now a return movement of the rear steering linkage, the piston rod 4 can again freely move to a straight ahead position to the right, by the movement of the rear steering linkage. If, in the process, there is overtravel of the straight ahead steering position or, into an area of approximate straight ahead, e.g., 5° in either direction, then switch 53 and associated controls later described feed high pressure into piston chamber 17 and 18 via respective pressure connection 21. In the instance of the steered position of FIG. 2, centering piston 19 is shifted to the right, specifically, until it again comes to rest against collar 23. Because of the pressure in centering piston chamber 17 and the travel limit ring 24, as the front axle runs through zero, that is to say, exactly in the straight-ahead position, a centering motion is provided piston rod 4, which because of leakages, would not by itself exactly return to straight ahead. In case of a further movement to the right, centering piston 19 remains on ring 24, while, in this case, centering piston 20 is moved to the right by collar 23. In case of a second motion direction reversal, the same action is repeated, analogously. This means that centering takes place every time the front axle runs through zero. The same applies at the end of a steering movement. This time, in case of a pressure release from piston chamber 12 locking piston 8 provides for mechanical locking since the locking pressure in piston chamber 12 is simultaneously lost and spring 16 biases piston 8 to lock piston 7.

FIG. 3 shows a version whereby locking mechanism 2 is integrated into centering device 3. Additionally, cylinder housing 1 is extended for a steering power cylinder 27 to actuate by hydraulic pressure the rear steering linkage 41(a) (symbolized in FIG. 4).

Additionally the front steering linkage also has geared manual steering force from gearing 48(a). A sealing block 28 provides for corresponding sealing and positioning of piston rod 4 and the two pressure flow ports 29 and 30 are in the usual manner connected with a pressure source in order to supply either steering power cylinder chamber 31 or 32 with pressure for the selected steering direction of piston rod 4.

In FIG. 3, piston rod 4(a) is shown heavier than the piston 4 in FIGS. 1 and 2 since it carries steering force. A power piston 33 in the usual manner separates the two piston chambers 31 and 32 from each other.

In this modification, lockable piston 7(a) has a center stop fixed in the housing as by locking washers 34 or any suitable means such as set screws.

Instead of travel stops 24 and 25 of FIGS. 1 and 2, the travel limit and centering stop is a sleeve 35 fixed in the housing and having a length that corresponds to the space between that of securing washers 34 abutted by centered pistons 19 and 20.

The pistons 19 and 20 about the radial edges of sleeve 35 in centered position of the rear axle 40(a).

In FIG. 3 a ventilation exhaust borehole 36 in locking piston 8 provides for pressure evacuation. A choke 37 is arranged in ventilation exhaust borehole 36. Ventilation exhaust borehole 36 is for connection to a tank T (not shown) via pressure equalization chamber 14 and port 15.

In both pressure connections 21 and 22 there is likewise in each case arranged a choke 38 which is formed by a corresponding cross-section change of the housing ports. Basically, the practical example according to FIG. 3 works in the same manner as described in FIGS. 1 and 2. Instead of a spiral spring 16 as in FIGS. 1 and 2, however, there are several leaf springs 39, arranged above each other, for the biased locking of the locking device. To release the locking, high pressure is once again fed into piston chamber 12 via a port 13, as a result of which locking piston 8 with lug 11 is lifted out of the groove in lockable piston 7(a) fixed on piston rod 4(a) which provides steering force. Piston 33 can then move under low pressure into piston chamber 31 or 32, depending upon the pressure feed direction for steering. In this case, either centering piston 19 or 20 is shifted by one or the other of the two lock washers 34 during directional shifting of piston rod. When pressure is fed into the centering piston chambers 17 and 18, the shifted centering piston 19 is again pushed back into its basic position and in the process also picks up and takes along piston rod 4, whereby the latter, when passing through the center position is centered by a sleeve 35 fixed in housing 1.

Since the multi-axle steering system depicted herein basically shows conventional known elements, only those operational elements pertaining to the invention will be described in greater detail below.

OPERATION

A front steering linkage 41 is steered hydro-mechanically in the usual way, while a rear steering linkage 41(a) is steered purely hydrostatically via a power cylinder 27 (FIG. 5) or 42 (FIG. 4) permanently connected via parallel lines 46, 47 with front steering power cylinder 48.

In FIGS. 4 and 5 cylinder housing 1 with locking unit 2 and centering device 3 are illustrated schematically.

The pressure supply of locking device 2 and centering device 3 is provided via a high pressure accumulator 44 and a hydraulic valve 45 connected therebetween. A low pressure accumulator 49 is normally used for steering and supplies an essentially lower pressure than the high pressure accumulator 44 normally used for centering. However, low pressure, only about 5-10 bar, maintains the centering pistons in centered position in a steered position. Thus, when piston rod 4 or 4(a) is shifted to a steered state, a lesser pressure is provided in both centering piston chambers 17 and 18. As a result, in event of a shift of one of the two centering pistons 19 or 20, the other, will always rest against collar 23 (FIG. 1) or lockable piston 7(a) (FIG. 3), and also against one of the two travel limit stops 24 or 25 or annular ring 35.

A feature which avoids long travel distances and travel time is that pistons 19 and 20 are pressure operated in only one direction.

To control the rear steering linkage 41(a) a control arrangement in the known manner will be described to meet various conditions, for example, a speed of less than 50 km/hr, straight ahead or centered position of front steering linkage 41.

The hydraulic system is electronically controlled wherein means comprising contact means 50 controls current to the other contact means wherein 51 controls speed response of the system. Switch 53 is responsive to straight ahead running whereby the position is sensed for the front steering linkage by sensor means 54.

Contact sensor means 54 responds within a steering linkage deflection predetermined angle of, for example, 5 degrees. Switch 55 is associated with switch 53 via relay K2 for the front steering linkage position, while switch 56 is associated with relay K1. A control signal lamp 57 indicates when the rear steering linkage has been actuated. A solenoid operated hydraulic valve 45 is actuated via switch 58.

The high pressure accumulator 44 is charged in the usual manner by a pump 60, driven by an electric motor 59.

The pressure connection and disconnection of the rear steering linkage 41(a) for steering is effected as follows: If steering comes below a steering angle of, for example, 5 degrees, in either direction, sensor 54 and thus switch 53 and, via relay K2, switches 55 and 58 will be actuated. If the speed is less than, for example, 50 km/hr switch means 51 is closed. If there is adequate pressure in high pressure accumulator 44, switch 52 is likewise closed. Relay K1 is energized and closes contact means 56. Signal light 57 goes on to indicate that the rear steering linkage is actuated. When 5 degrees steering angle is exceeded, contact 54 is interrupted. Relay K2 drops via switch 53, switch 58 is closed, and valve 45 is actuated. Simultaneously, this is the working position of the hydraulic pressure connections between the steering power cylinder 48 of the front axle to transmit pressure flow to the hydrostatic cylinder 27, 42 of the rear axle 40(a), whereby that cylinder is pressurized.

In case of several steered rear axles, the transmitter steering power cylinder 48 of the front axle, can also be used as a pressure transmitter cylinder for rear axle 40(a) but also for selective control of a valve, wherein, in this case, a separate hydraulic unit, for example, a separate pump, is provided for the rear-axle steering.

In the working position, that is to say, in the steering position of rear axle 40(a), pressure connections 21 and 22 of centering piston chambers 17 and 18 are switched to low pressure accumulator 49. At the same time, pressure is fed into piston chamber 12 via flow connection 13, as a result of which locking piston 8 is actuated to release lockable piston 7. Piston rod 4, 4(a) is free for steering.

Steering power cylinder 27, 42, will provide hydraulic boosting of steering power.

If the front axle angle deviation is less than 5°, switch 58 is opened and valve 45 drops. As a result, centering piston chambers 17 and 18 again receive pressure, specifically, on both sides, in each case, the same pressure. In this way, there is a hydraulic centering of rear axle 40(a), wherein this centering takes place every time the rear steering linkage passes through the zero position, i.e., straight ahead steering.

The hydraulic circuit diagram according to FIG. 5 basically has the same structure as that in FIG. 4. The only difference merely resides in the fact that, in this case, there is no separate steering power cylinder 48, instead, the latter is integrated into the locking/centering unit 2, 3, specifically as shown in the practical example of FIG. 3.

In summation, when the rear wheels are centered both pistons 19,20 rest against a stop 23 or 7(a) fixed on the piston and stops fixed in the housing 24, 25, or 35.

Upon a steering operation the piston rod movement is left or right depending the direction of steering and a piston rod 4 or 4(a) being thus unlocked from the centered position.

If, for example, pressure chamber 17 (FIG. 1) or 32 (FIG. 5) is pressurized the piston rod movement is to the left, the stop 23 or 7(a) fixed on the piston 4 or 4(a) will carry piston 19 to the left, but piston 20 remains at the centered position against the stops fixed in the housing due to pressure maintained in pressure chamber 18.

At the end of a steering operation when the front wheels are manually centered, chamber 17 is pressurized to force piston 19 back to center position. However, due to leakage the rear axle 40(a) will not be exactly centered.

Accordingly, the front axle will be continuously steered back and forth past center for less and less angle within 5° left and right of center until the piston rod 4 or 4(a) is centered and locked. The rear wheels are then centered and locked in synchronization with the front wheels to compensate for the leakage and thus achieving the purpose of the invention.

We claim:

1. A multi-axle steering system for vehicles having a front axle (40) and a front steering linkage (41) with a front power steering pressure cylinder (48) having pressure chambers; a rear axle (40(a)) with a rear steering linkage (41(a)) and a rear power steering pressure cylinder (42, 27); a housing (1); a locking device (2) for said rear axle; and a piston rod (4, 4(a)) and a centering device (3) comprising centering pistons (19, 20) slidably carried on said piston rod (4, 4(a)); respective pressure chambers (17, 18) in said housing; said pistons being slidable by pressure in said respective pressure chambers; a lockable collar (23, 7(a)) carried fixedly on said piston rod (4, 4(a)) at a location defining a central position of said rear axle;

the improvement wherein travel limit stop means comprising rings (24, 25, 35) fixed in said housing having sides spaced to be engaged by respective slidable pistons to effect a centered position by respective slidable pistons to effect a centered position of said piston rod and thus said rear steering linkage to center said rear axle; a pressure source (44) actuated by control means comprising a switch (53) for pressurizing said pressure chambers (17, 18) responsive to steering of the front axle for centering said rear axle to straight ahead steering by selecting sliding of said slidable pistons (19, 20) to engage respective sides of said fixed collar (23, 7(a)) and respective sides of said rings (24, 25, 35) whereby the pressure chambers are alternately pressurized continuously to center the rear axle each time the front axle passes the straight ahead position within predetermined angularity to each side of center to compensate for leakage by synchronizing said axles in straight ahead steering; the pressure chambers (17, 18) of the centering device (3) being connected to the pressure source (44) for operation of said steering pistons (19, 20).

2. A multi-axle steering system as set forth in claim 1, wherein said pressure source (44) provides high pressure for normally pressurizing pressure chambers (17, 18) for centering the rear axle; and a low pressure source (49) for normally pressurizing the power steering cylinders for steering.

3. A multi-axle steering system as set forth in one of the claims 1 or 2, including a locking mechanism (2) in said centering device (3), having a locking piston (8) and means for pressure operation to unlock said locking piston; a pressure exhaust bore (36) through said locking piston (8) for connection to a tank for return of a pressure medium from said pressure chamber (17, 18) and a choke (37) in said pressure exhaust bore to throttle flow therethrough.

4. A multi-axle steering system as set forth in claim 1, said piston rod (4, 4(a)) being reciprocal in said housing (1); and a lockable piston (7) carried fixedly on said piston rod spaced from said centering pistons (19, 20) to be engaging by said locking piston (8) for locking said.

5. A multi-axle steering system as set forth in claim 4, including a bias spring (16, 39) for biasing the locking piston (8) into a position for engaging said lockable piston (7) to lock said piston rod (4, 4(a)) against movement when said rear axle is centered said bias spring comprising a stacked array of disc springs.

6. A multi-axle steering system as set forth in claim 1, including flow line connections (46, 47) between the pressure chambers of said front power steering pressure cylinder (48) and chambers of said rear power steering pressure cylinder (42, 27).

* * * * *